(12) United States Patent
Park et al.

(10) Patent No.: US 10,540,073 B2
(45) Date of Patent: Jan. 21, 2020

(54) MOBILE TERMINAL AND METHOD FOR CONTROLLING CAMERA-MOUNTED EXTERNAL DEVICE

(71) Applicant: LG ELECTRONICS INC., Seoul (KR)

(72) Inventors: Junsoo Park, Seoul (KR); Joohyeon Oh, Seoul (KR); Jungmin Park, Seoul (KR); Hyunju Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 759 days.

(21) Appl. No.: 15/024,230

(22) PCT Filed: Sep. 24, 2013

(86) PCT No.: PCT/KR2013/008548
§ 371 (c)(1),
(2) Date: Mar. 23, 2016

(87) PCT Pub. No.: WO2015/046636
PCT Pub. Date: Apr. 2, 2015

(65) Prior Publication Data
US 2016/0216879 A1    Jul. 28, 2016

(51) Int. Cl.
*G06F 3/0484* (2013.01)
*G06F 3/0482* (2013.01)
(Continued)

(52) U.S. Cl.
CPC ........ *G06F 3/04847* (2013.01); *G06F 3/0482* (2013.01); *G06F 3/0488* (2013.01);
(Continued)

(58) Field of Classification Search
CPC ............ G06F 3/04847; G06F 3/04883; G06F 3/0488; G06F 3/0482; G06F 3/04815;
(Continued)

(56) References Cited

U.S. PATENT DOCUMENTS 9,438,937 B1 * 9/2016 Buchheit .......... H04N 21/23424
2008/0014906 A1 * 1/2008 Tysowski ............ G06F 17/3028
455/412.1
(Continued)

FOREIGN PATENT DOCUMENTS

JP        2010-133655 A    6/2010
KR   10-2009-0065774 A    6/2009
(Continued)

*Primary Examiner* — Justin R. Blaufeld
(74) *Attorney, Agent, or Firm* — Birch, Stewart, Kolasch & Birch, LLP

(57) ABSTRACT

The present disclosure provides a mobile terminal comprising: a wireless communication unit for receiving an image acquired by a camera mounted on an external device; a display unit for outputting the image and receiving a first touch input that is continuously applied for transmitting a wireless signal for changing the capturing range of the camera; and a control unit for switching the image to a control screen for receiving a second touch input for controlling the external device when the capturing range of the camera based on the first touch input reaches a preset limited range. The control unit controls the display unit to switch the image to the control screen in a continuous manner on the basis of the direction of the continuous first touch input.

19 Claims, 18 Drawing Sheets

(51) Int. Cl.
*H04L 12/28* (2006.01)
*G06F 3/0481* (2013.01)
*G06F 3/0488* (2013.01)
*H04N 5/232* (2006.01)

(52) U.S. Cl.
CPC ...... *G06F 3/04815* (2013.01); *H04L 12/2803* (2013.01); *H04L 12/2816* (2013.01); *H04N 5/23216* (2013.01); *H04N 5/23293* (2013.01)

(58) Field of Classification Search
CPC ............ H04N 5/23293; H04N 5/23216; H04L 12/2816; H04L 12/2803
See application file for complete search history.

(56) References Cited

U.S. PATENT DOCUMENTS

| | | | | |
|---|---|---|---|---|
| 2008/0052945 | A1* | 3/2008 | Matas | G06F 3/0485 34/173 |
| 2008/0155433 | A1* | 6/2008 | Robertson | G06F 3/0481 715/762 |
| 2008/0189650 | A1* | 8/2008 | Scott | G06F 3/0485 715/784 |
| 2008/0276280 | A1* | 11/2008 | Nashida | H04N 5/44543 725/48 |
| 2009/0157228 | A1 | 6/2009 | Hong et al. | |
| 2010/0304731 | A1* | 12/2010 | Bratton | H04N 5/232 455/420 |
| 2011/0037851 | A1* | 2/2011 | Kim | G06F 3/04847 348/143 |
| 2011/0074710 | A1* | 3/2011 | Weeldreyer | G06F 3/0481 345/173 |
| 2011/0085016 | A1* | 4/2011 | Kristiansen | G06F 3/04883 348/14.03 |
| 2011/0304750 | A1* | 12/2011 | Lee | H04N 5/23293 348/240.99 |
| 2012/0075465 | A1 | 3/2012 | Wengrovitz et al. | |
| 2012/0130513 | A1* | 5/2012 | Hao | G05B 15/02 700/90 |
| 2012/0272181 | A1* | 10/2012 | Rogers | G06F 3/0482 715/784 |
| 2013/0069985 | A1* | 3/2013 | Wong | G02B 27/017 345/633 |
| 2013/0187873 | A1* | 7/2013 | Jeong | G06F 3/0488 345/173 |
| 2013/0288719 | A1* | 10/2013 | Alonzo | H04W 4/043 455/457 |
| 2014/0002502 | A1* | 1/2014 | Han | G06T 11/60 345/646 |
| 2014/0333667 | A1* | 11/2014 | Jung | G06T 11/00 345/633 |
| 2014/0375862 | A1* | 12/2014 | Kim | H04N 5/23245 348/333.02 |
| 2015/0222862 | A1* | 8/2015 | Lee | G08C 17/02 348/143 |
| 2016/0139752 | A1* | 5/2016 | Shim | G06F 3/0483 715/771 |
| 2016/0202948 | A1* | 7/2016 | Chen | G06F 3/1454 715/746 |
| 2017/0046053 | A1* | 2/2017 | Liu | G06K 9/00718 |

FOREIGN PATENT DOCUMENTS

| | | |
|---|---|---|
| KR | 10-2012-0031781 A | 4/2012 |
| KR | 10-2012-0105201 A | 9/2012 |

* cited by examiner

MOBILE TERMINAL AND METHOD FOR CONTROLLING CAMERA-MOUNTED EXTERNAL DEVICE

TECHNICAL FIELD

The present disclosure relates to a mobile terminal capable of controlling a camera provided on the external device and the external device.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

In recent time, development is undergoing for functions capable of controlling, by using a mobile terminal, cooling/heating systems such as a boiler, an air conditioner and the like, kitchen appliances such as a microwave oven, an electric rice cooker, a dish dryer and a dish washer, and home appliances such as a washing machine and the like, in addition to a computer, a lighting device, a TV set, an audio device, a pet feeder, etc.

However, in general, the mobile terminal outputs unique (specific) icons for receiving a touch input applied thereto for controlling each home appliance, and a user cannot intuitively sense such icons.

DISCLOSURE OF THE INVENTION

Therefore, to obviate those problems, an aspect of the detailed description is to provide a mobile terminal capable of more easily controlling an external device while receiving an image captured by a camera of the external device.

To achieve these and other advantages and in accordance with the purpose of the present invention, as embodied and broadly described herein, there is provided a mobile terminal, which is one example associated with the present invention, the mobile terminal including a wireless communication unit capable of receiving an image obtained by a camera mounted on an external device, a display unit capable of outputting the image, and receiving a first touch input continuously applied thereto to transmit a wireless signal for changing a capturing range of the camera, and a controller capable of switching the image into a control screen receiving a second touch input for controlling the external device, when the capturing range of the camera reaches a preset limit based on the first touch input, wherein the controller controls the display unit to switch the image into the control screen in a continuous form based on a direction of the continuously-applied first touch input.

In one embodiment of the present invention, the mobile terminal may further include a memory capable of storing at least one image obtained by the camera and the control screen.

In one embodiment of the present invention, the control screen may correspond to a first control screen including a shape of an appearance of the external device and button images for controlling the external device.

In one embodiment of the present invention, the control screen may correspond to a second control screen which includes an image associated with internal structures of the external device, and button images for receiving touch inputs to control the respective internal structures, so as to control the external device.

In one embodiment of the present invention, the controller may control the display unit to output a second control screen, which includes an image associated with internal structures of the external device, and button images for receiving touch inputs to control the respective internal structures, when a second touch input is continuously applied to the display unit in the output state of the first control screen, In one embodiment of the present invention, the controller may control the display unit to switch the control screen back into the image, in response to a third touch input applied to the display unit in the output state of the control screen.

In one embodiment of the present invention, the controller may control the wireless communication unit to transmit a control signal for controlling an operation of the camera to the external device, based on the third touch input. Also, the controller may control the wireless communication unit to receive an image captured by the camera, starting from one limit selected based on the third touch input.

In one embodiment of the present invention, the controller may control the wireless communication unit to receive an image captured in a second direction, opposite to a first direction, based on a third touch input continuously applied in the first direction.

In one embodiment of the present invention, the controller may control the display unit to restrict an output of a partial region of the control screen when the control screen is moved in response to the third touch input, and the display unit may output an image obtained by the camera, continuously with one edge of the control screen.

In one embodiment of the present invention, the controller may generate a control command for zooming the camera in based on an applied region of a fourth touch input, when the fourth touch input is applied to the image. The controller may control the display unit to output a third control screen for controlling another device included in the image when the fourth touch input is continuously applied.

In one embodiment of the present invention, the controller may control the display unit to output the image captured by the camera along with the control screen in an overlapping manner.

In one embodiment of the present invention, the controller may control the display unit to gradually adjust transparency of the image or gradually adjust an output region of the image while the image is switched into the control screen.

To achieve these and other advantages and in accordance with the purpose of the present invention, as embodied and broadly described herein, there is provided a control system, including a camera capable of generating an image by capturing an external environment including at least one external device, and a mobile terminal capable of receiving the image, wherein the mobile terminal includes a wireless communication unit capable of receiving a wireless signal associated with the image, a display unit capable of outputting the image and receiving a touch input for adjusting a capturing range of the camera, and a controller capable of controlling the display unit to output a control screen for controlling one of the at least one external device when the capturing range reaches a limit point by the touch input.

In one embodiment of the present invention, the touch input applied to the display unit may correspond to a control command for zooming the camera in for enlarging an image of the one external device.

In one embodiment of the present invention, the touch input applied to the display unit may correspond to a control command for zooming the camera out. The control screen may include at least one control image for receiving a touch input to control each of the at least one external device.

To achieve these and other advantages and in accordance with the purpose of the present invention, as embodied and broadly described herein, there is provided a method for controlling a mobile terminal, the method including receiving an image obtained by a camera mounted on an external device, outputting the image on a display unit, transmitting a wireless signal for changing a capturing range of the camera, in response to a first touch input applied to the display unit, outputting an image according to the changed capturing range, and switching the image into a control screen of the external device based on the continuously-applied first touch input, when the capturing range reaches a limit.

In one embodiment of the present invention, the method may further include receiving a second touch input applied to the display unit with the control screen output thereon, and transmitting a control command based on the second touch input to the external device.

In one embodiment of the present invention, the method may further include switching the control screen back into the image when the first touch input is continuously applied while the control screen is output.

In one embodiment of the present invention, the display unit may be controlled to switch the control screen back into the image, in response to a third touch input different from the first touch input, while the control screen is output, and the first and third touch inputs may be applied onto the display unit in opposite directions to each other.

In one embodiment of the present invention, the display unit may be controlled to switch the control screen back into the image, in response to a third touch input different from the first touch input, while the control screen is output, and the first and third touch inputs applied to the display unit during the output of the image may correspond to control commands for zooming in and zooming out the camera, respectively.

ADVANTAGEOUS EFFECT

In accordance with the detailed description, with respect to an external device connected to perform wireless communication among various external devices, an image captured by a camera may be output and a control screen including control buttons of each of the external devices may be output. This may allow a user to selectively control various devices.

Also, an external device can be controlled by applying a touch input for controlling a camera while an image obtained through the camera is output, accordingly, any separate entering method for controlling the external device may not be required.

As such, the user can control an external device in a faster manner, and feel like controlling the external device at a place close to it because the image captured by the camera 911 is switched into a control screen including a shape of an appearance of the external device.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
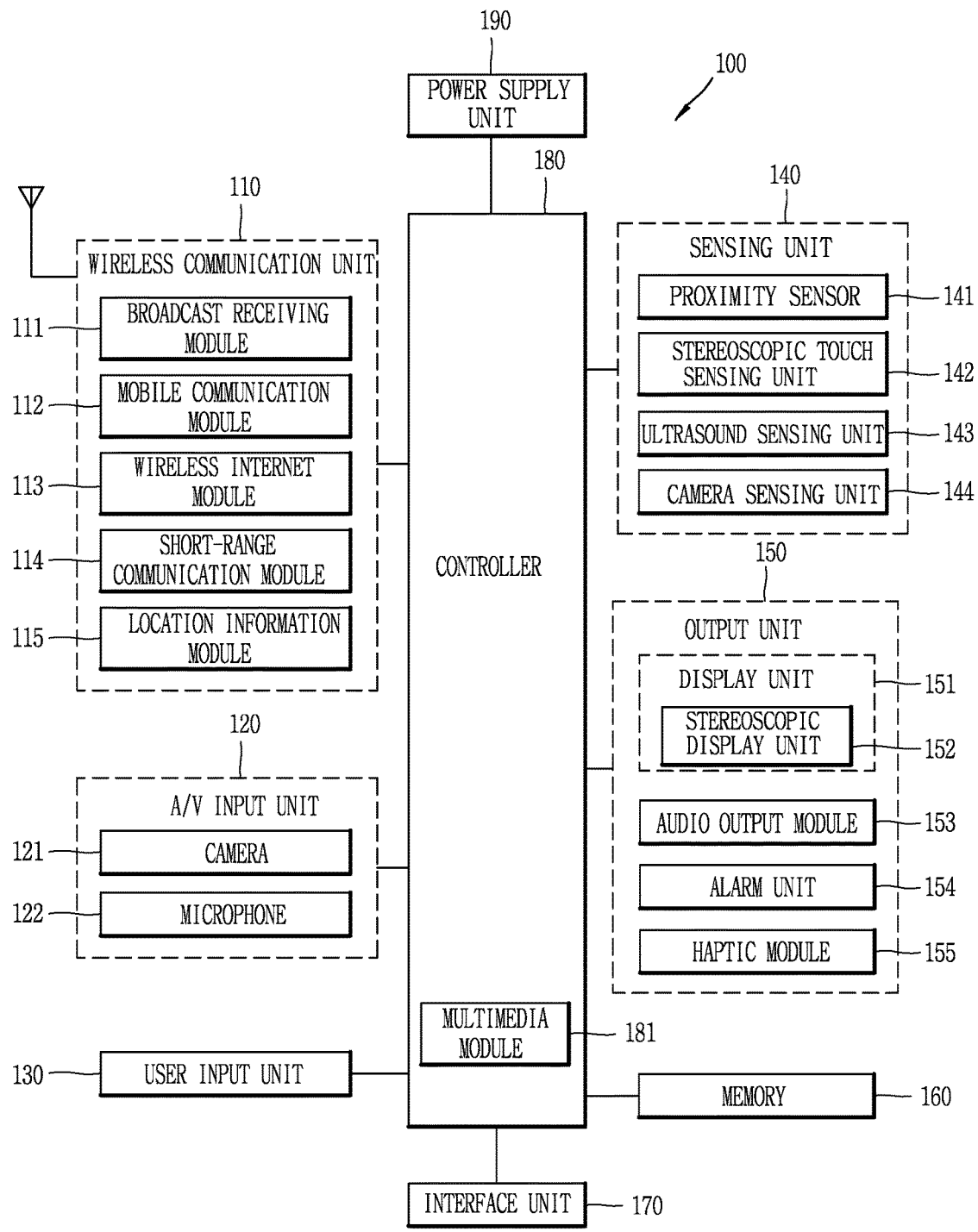
FIG. 1 is a block diagram of a mobile terminal in accordance with one exemplary embodiment disclosed herein.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a Wireless Fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable lens, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the vibration generated in the haptic module 155 can be controlled by a user selection or a setting of the controller 180. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority to use the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
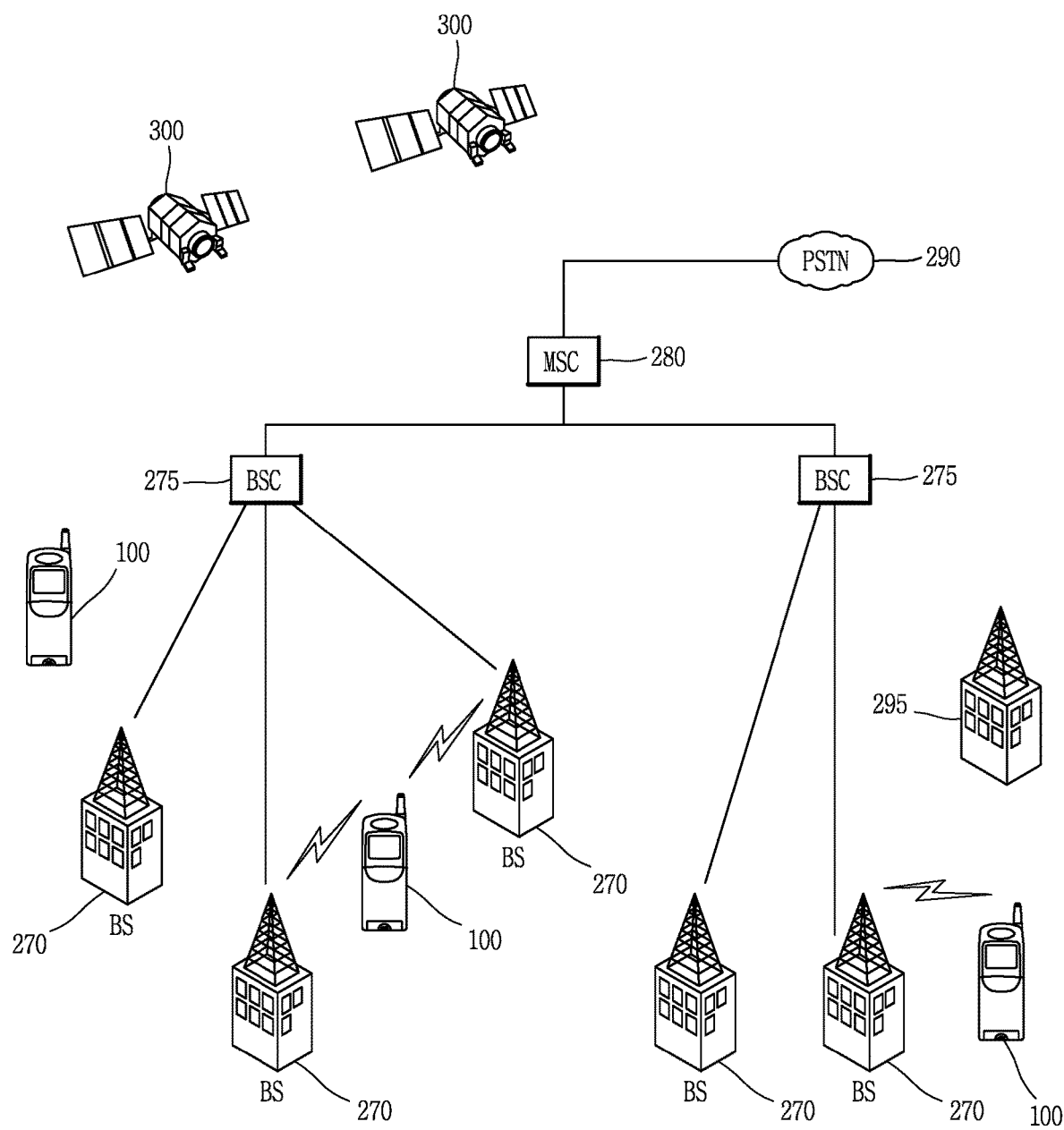
FIGS. 2A and 2B are conceptual views of a communication system operable with a mobile terminal in accordance with one exemplary embodiment.
Figure 2B:
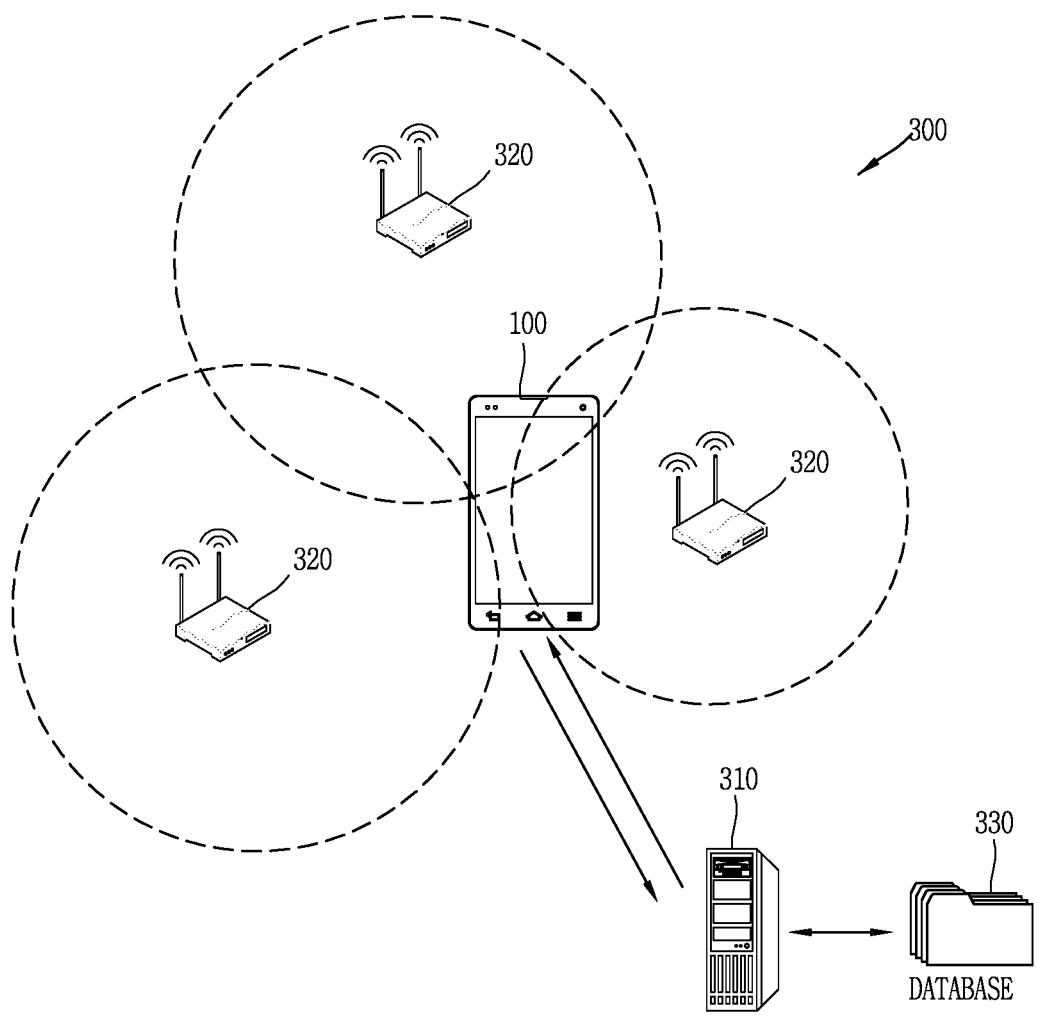

Hereinafter, a communication system which is operable with the mobile terminal 100 according to the present disclosure will be described. FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
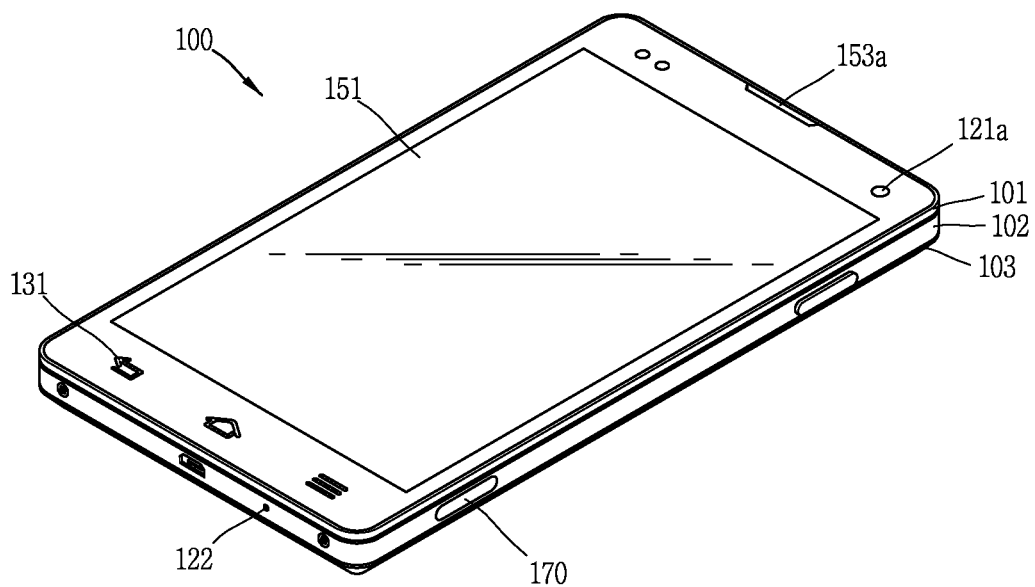
FIG. 3A is a front perspective view illustrating one example of a mobile terminal in accordance with the present invention.

FIG. 3A is a front perspective view illustrating an example of the mobile terminal 100 associated with the present invention.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
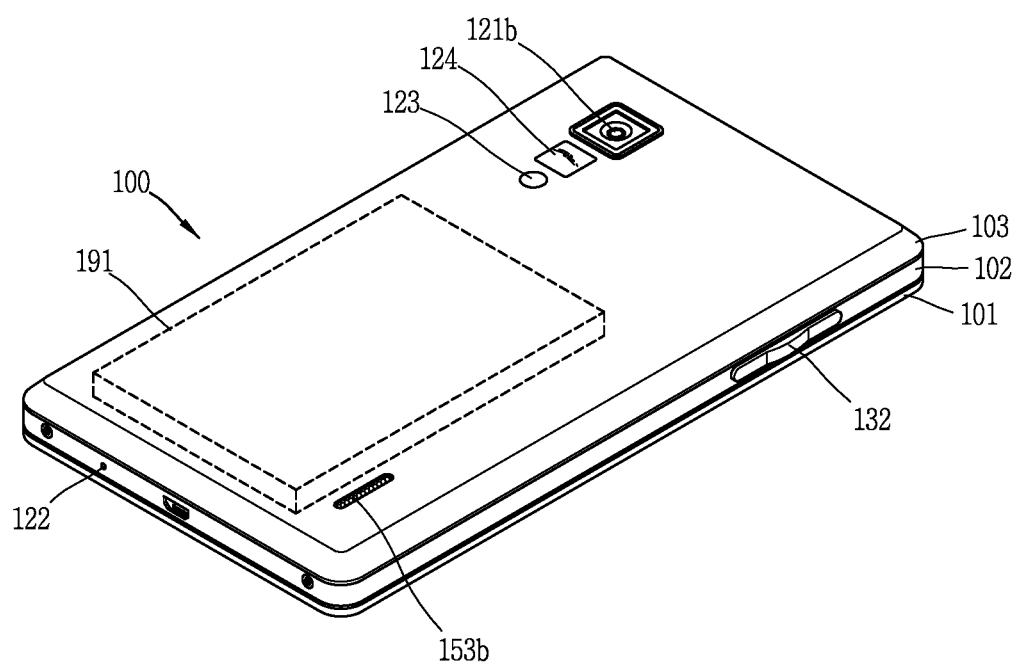
FIG. 3B is a rear perspective view of the mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

The thusly-extracted position information regarding the mobile terminal 100 may be transmitted to the mobile terminal 100 through the WPS server 310, thereby obtaining the position information of the mobile terminal 100.

Figure 4:
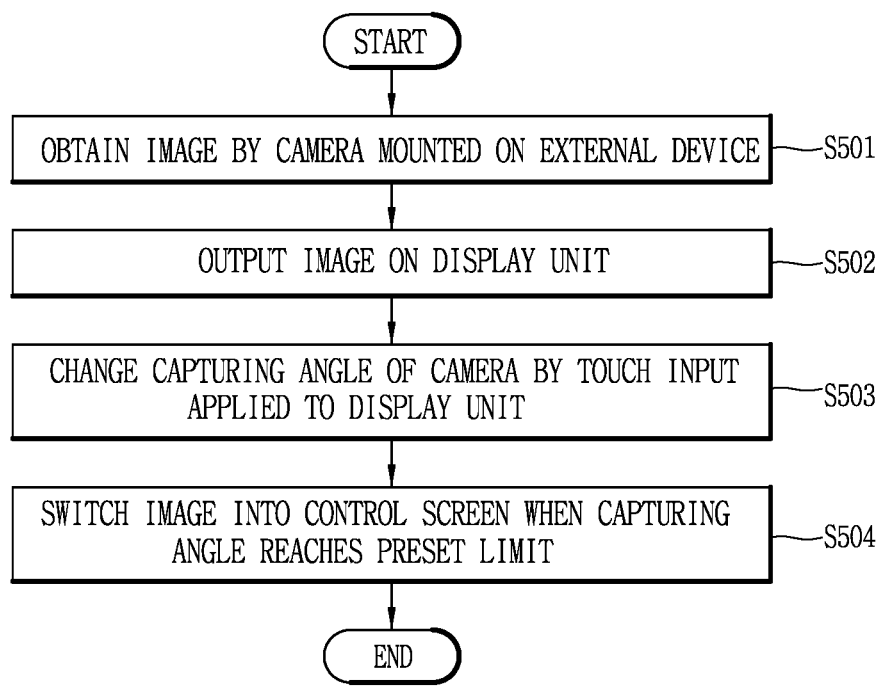
FIG. 4 is a flowchart illustrating a method for controlling a mobile terminal in accordance with one exemplary embodiment disclosed herein.
Figure 5A:
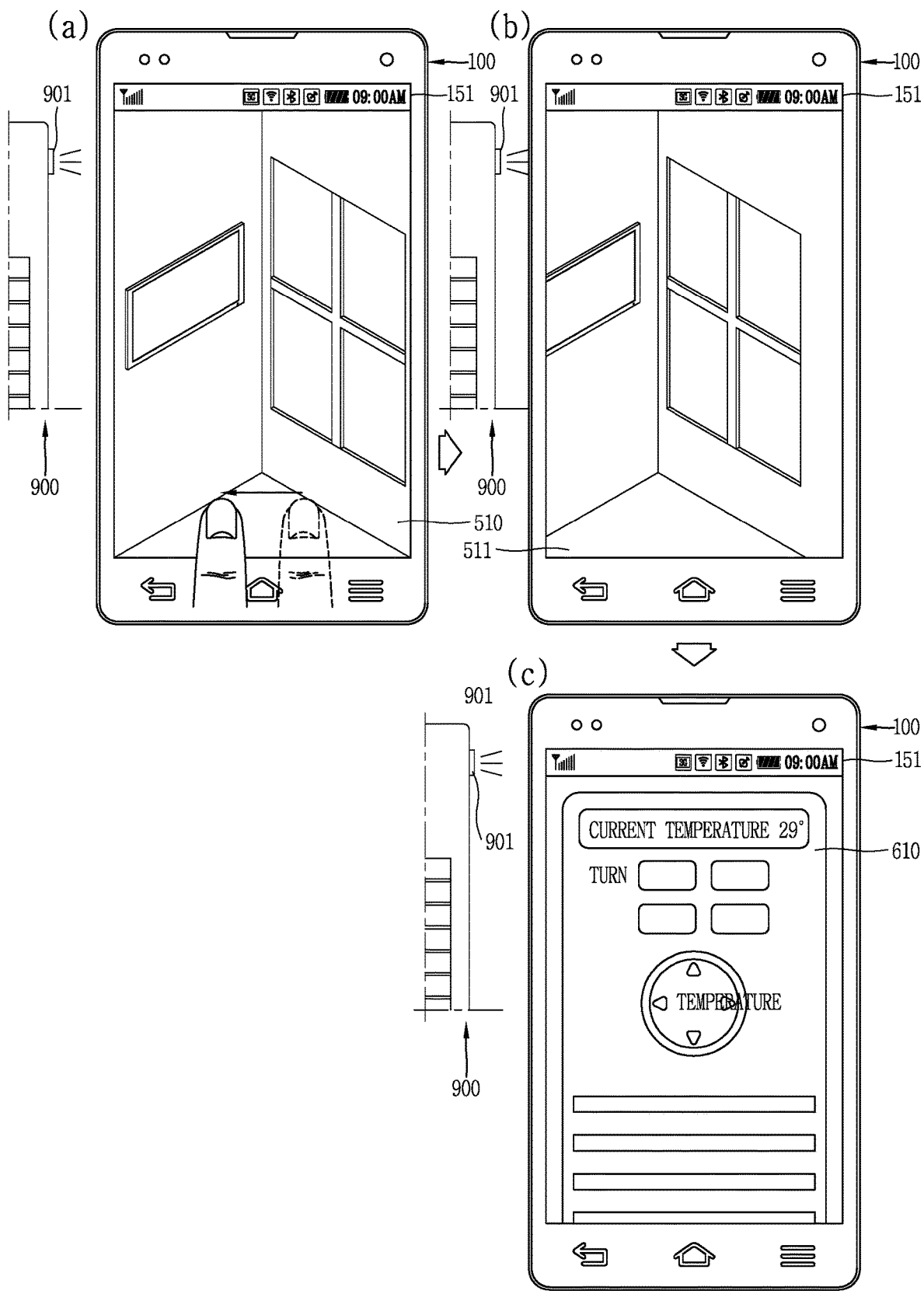
FIGS. 5A to 5C are conceptual views illustrating the control method of FIG. 4 in accordance with various exemplary embodiments.

FIG. 4 is a flowchart illustrating a method for controlling a mobile terminal in accordance with one exemplary embodiment disclosed herein, and FIG. 5A is a conceptual view illustrating the control method of FIG. 4 in accordance with one exemplary embodiment.

An image may be obtained by a camera mounted on an external device (S501). For example, the external device 900 may correspond to an air conditioner and be provided with a camera 901. The camera 901 may be installed to capture a front side of the external device 900. The camera 901 may capture a front external environment of the external device 900 within a preset limit. The camera 901 may change a capturing direction to left or right or up or down.

The display unit of the mobile terminal 100 which is wirelessly connected with the external device 900 may receive an image 510 of the external environment obtained using the external device 900. The controller may control the display unit 151 to output the received image 510 (S501).

A capturing angle of the camera may change based on a first touch input applied to the display unit 151 (S503). That is, the controller may generate a control command for changing the capturing direction of the camera 901 based on a touch input applied to the display unit 151 while the image 510 is output on the display unit 151. Also, the controller may control the wireless communication unit 110 to transmit the control command to the external device 900 in real time.

For example, the first touch input may correspond to a touch (e.g., a drag touch input or a flicking touch input) which is continuously applied on the display unit 151 along one direction. The controller may control the wireless communication unit 110 to transmit the control command for changing the capturing direction of the camera 901 based on the direction of the first touch input.

The controller may receive a transformed image 511, which has been captured in the capturing direction changed based on the first touch input, from the external device 900, and control the display unit 151 to output the transformed image 511.

Although not illustrated in detail, the memory 160 may prestore at least one image corresponding to each capturing range, which has captured in advance by the camera 901 of the external device 900. That is, the controller may output the prestored image in the memory 160, in replacement of an image which the camera 901 has failed to capture due to a touch input applied by a user suddenly or fast.

Accordingly, the user can be provided with a more natural captured image and can feel like actually looking at the front side of the external device 900, standing in front of the external device 900.

When the capturing range of the camera 901 reaches a preset limit based on the first touch input, the controller may switch the image 510 into a first control screen 610 (S504).

Here, the first control screen 610 may correspond to screen information for controlling an operation of the external device 900. According to this exemplary embodiment, the first control screen 610 may include at least one graphic image receiving a touch input to operate the external device 900, and an image indicating an appearance of the external device 900. That is, the first control screen 610 may be implemented substantially the same as a part of a shape of the appearance of the external device 900 including buttons selected by the user.

The memory 160 may prestore the first control screen 610. That is, the controller may recognize the external device 900 which performs communication with the mobile terminal 100 in a wireless manner, and select the first control screen 610 from the memory 160 while outputting the image received by the camera 901.

Accordingly, the controller can control the display unit 151 to immediately switch the image into the first control screen 610.

The controller may generate a control signal for controlling the external device 900 by applying a second touch input to the first control screen 610, and control the display unit 151 to transmit the generated control signal to the external device 900.

Although not illustrated in detail, the display unit 151 may change an output state of the graphic image when a touch input is applied to the graphic image and the control signal is transmitted. For example, the display unit 151 may output an image like a pressed button, or the controller may control the terminal body to vibrate when the touch input is applied to the graphic image.

This may allow the user to be provided with a control screen configuring the appearance of the external device 900 while receiving the external environment through the camera 901 provided on the external device 900. Accordingly, the user can feel like standing in front of the external device 900. Accordingly, the user can control the external device 900 more intuitively by using the mobile terminal 100.

Figure 5B:
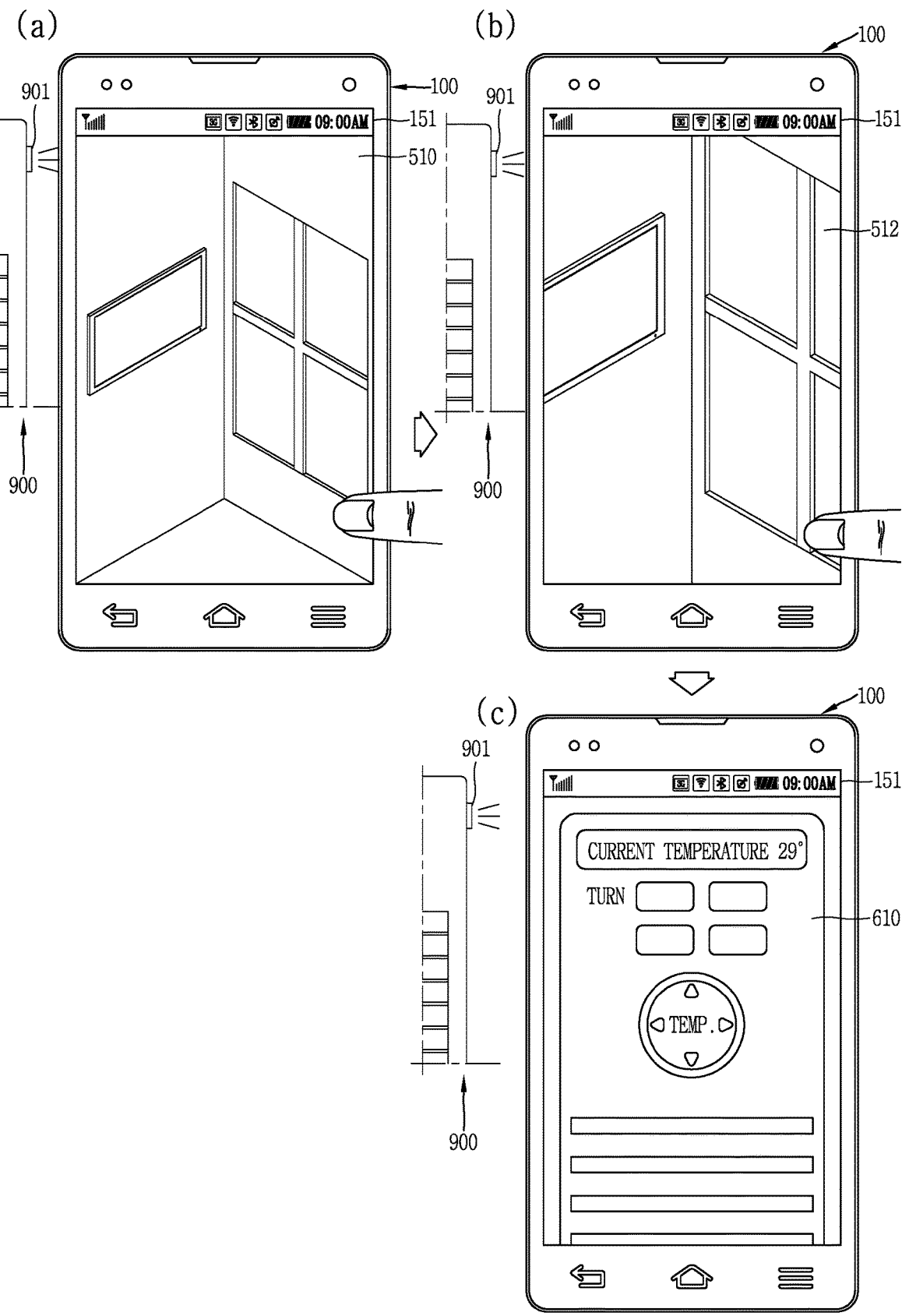

Hereinafter, a control method of providing a control screen of the external device 900 based on a different type of touch input, with reference to FIG. 5B. The controller may execute a zoom-in function of the camera 901 when a long touch input is applied to the display unit 151 while the captured image 510 is output.

That is, while the camera 901 captures a specific capturing direction, when a touch input applied for a preset time (e.g., several seconds) is received on the display unit 151, the controller may transmit a control command for executing the zoom-in function of the camera 901. Also, the controller may control the display unit 151 to output an image 512 which has been captured after zooming in.

Upon reaching a limit of the zoom-in function by the long touch input, the controller may switch the image 512 into the first control screen 610. The control screen maybe substantially the same as the first control screen 610 illustrated in FIG. 5A, and thus repetitive description will be omitted.

Figure 5C:
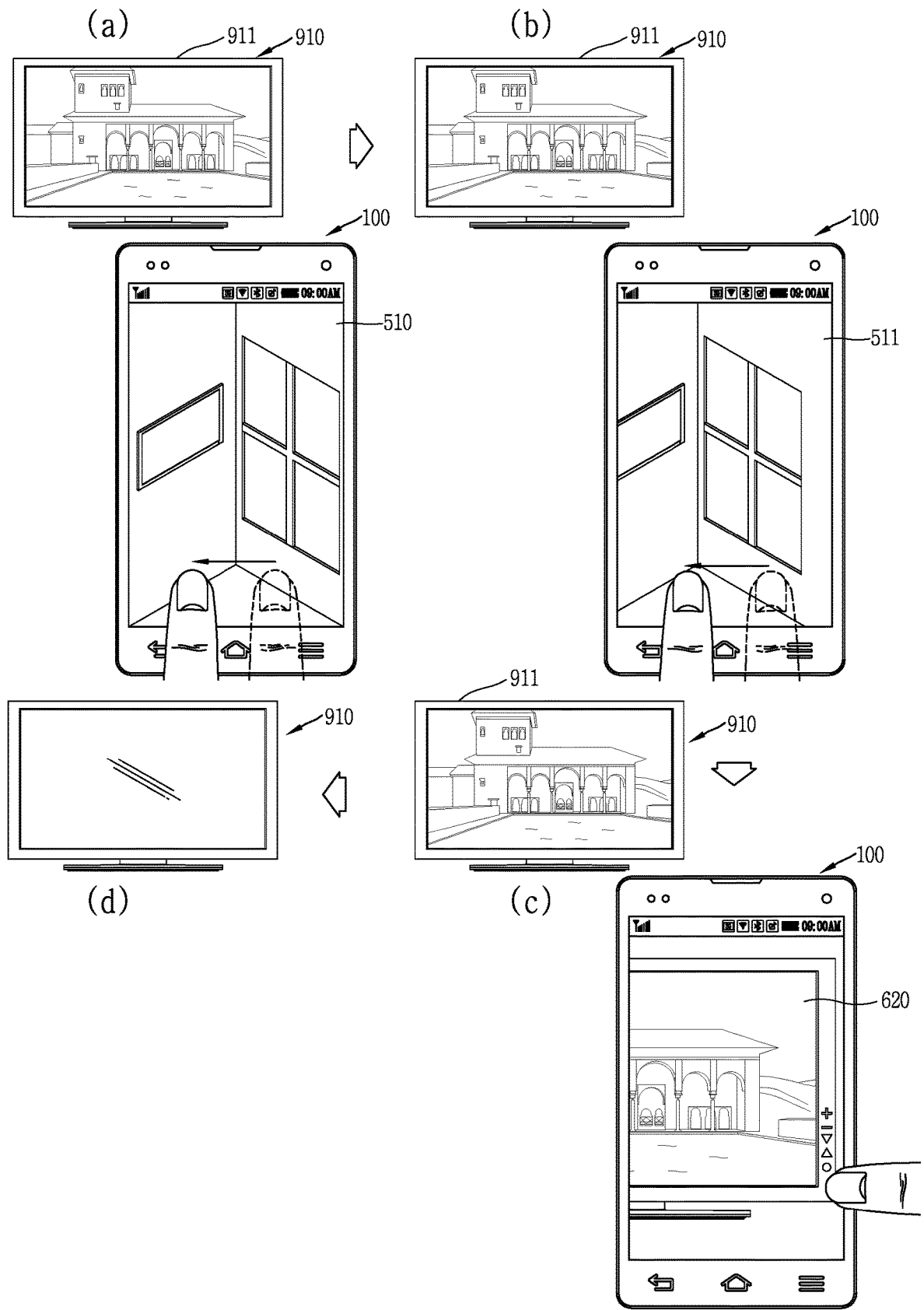

Hereinafter, a control method of controlling another external device with a camera 911 mounted thereon using the mobile terminal, with reference to FIG. 5C. According to this exemplary embodiment, the another external device 910 may correspond to a television.

The controller may control the display unit 151 to output an image 510 captured by the camera 911 which is mounted on a front surface of the external device 910. Also, the controller may control a capturing range of the camera 911, in response to a first touch input applied to the display unit 151 while the image 510 is output on the display unit 151. The controller may control the display unit 151 to continuously output a transformed image 511 according to the capturing range based on the first touch input.

When the capturing range of the camera 911 reaches a preset limit based on the first touch input, the controller may control the display unit 151 to switch the image 510 into a control screen 620 for controlling the external device 910.

The control screen 620 may be screen information corresponding to a part of an appearance of the external device 910. For example, when a control button for controlling the television as the external device 910 is provided at a right lower end of the appearance of the television, the control screen 620 may be configured into a shape indicating the right lower end of the appearance of the television.

The controller may control the wireless communication unit 110 to transmit a control signal for controlling the external device 910, in response to a second touch input applied to the control screen 620.

For example, when the second touch input is applied to a graphic image corresponding to a power button, the controller may control the wireless communication unit 110 to transmit a control signal for turning off the external device 910 to the external device 910.

That is, the mobile terminal can output an image captured by the camera 911 of the external device 910 and output a control screen indicating a control button of the external device 910, with respect to the external device 910 which is connected thereto to perform wireless communication, among various types of external devices. Accordingly, the user can selectively control such various devices.

Also, the mobile terminal can control the external device 910 by a touch input for controlling the camera 911 while outputting the image through the camera 911, and thus may not need any separate entering method for controlling the external device 910.

Consequently, the user can control the external device 910 in a faster manner. In addition, the user can feel like controlling the external device 910 at a place close to the external device because of the switching from the image captured by the camera 911 into the control screen including the appearance of the external device 910.

FIGS. 6A to 6D are conceptual views illustrating a method for controlling the mobile terminal based on a touch input applied to the display unit 151 while a control screen is output.

Hereinafter, a control method of continuously outputting different control screens will be described with reference to FIG. 6A. The controller may change the capturing range of the camera 901 based on a first touch input continuously applied while the image 510 is output. When the capturing range reaches the limit, the controller may control the display unit 151 to switch the image 510 (or a transformed image 513) into a second control screen 630.

Here, the first touch input may be defined different from the touch input illustrated in FIG. 5A in view of an applied direction. For example, the first touch input according to this exemplary embodiment may correspond to a drag touch input which is applied from top to bottom of the display unit 151.

The second control screen 630 may be discriminated from the first control screen 610. The second control screen 630 may include an image associated with an inner space of the external device 900, and a graphic image receiving a touch input for controlling an internal structure (or an internal element) of the external device 900. That is, the second control screen 630 output on the display unit 151 may allow the user to feel like looking at the inner space of the external device 900.

However, the information configuring the second control screen 630 may not be limited to those, and alternatively further include icons representing an internal structure that the user desires to control as well as the inner space.

When a touch input is applied to the graphic image while the second screen information 630 is output, the controller may control the wireless communication unit 110 to transmit a control signal for controlling an internal structure of the external device 900 to the external device 900.

Also, the controller may control the display unit 151 to output the first control screen 610, in response to a fourth touch input applied to the display unit 151 while the second screen information 630 is output. For example, the fourth touch input may correspond to a touch input applied substantially in the same direction as the applied direction of the first touch input.

That is, the controller may adjust the capturing direction of the camera 901 and control the display unit 151 to continuously output the first and second control screens, in response to the touch inputs continuously applied in the same direction.

This may allow the user to feel like checking the internal structure of the external device 900 as well as feeling like standing in front of the external device 900.

Figure 6A:
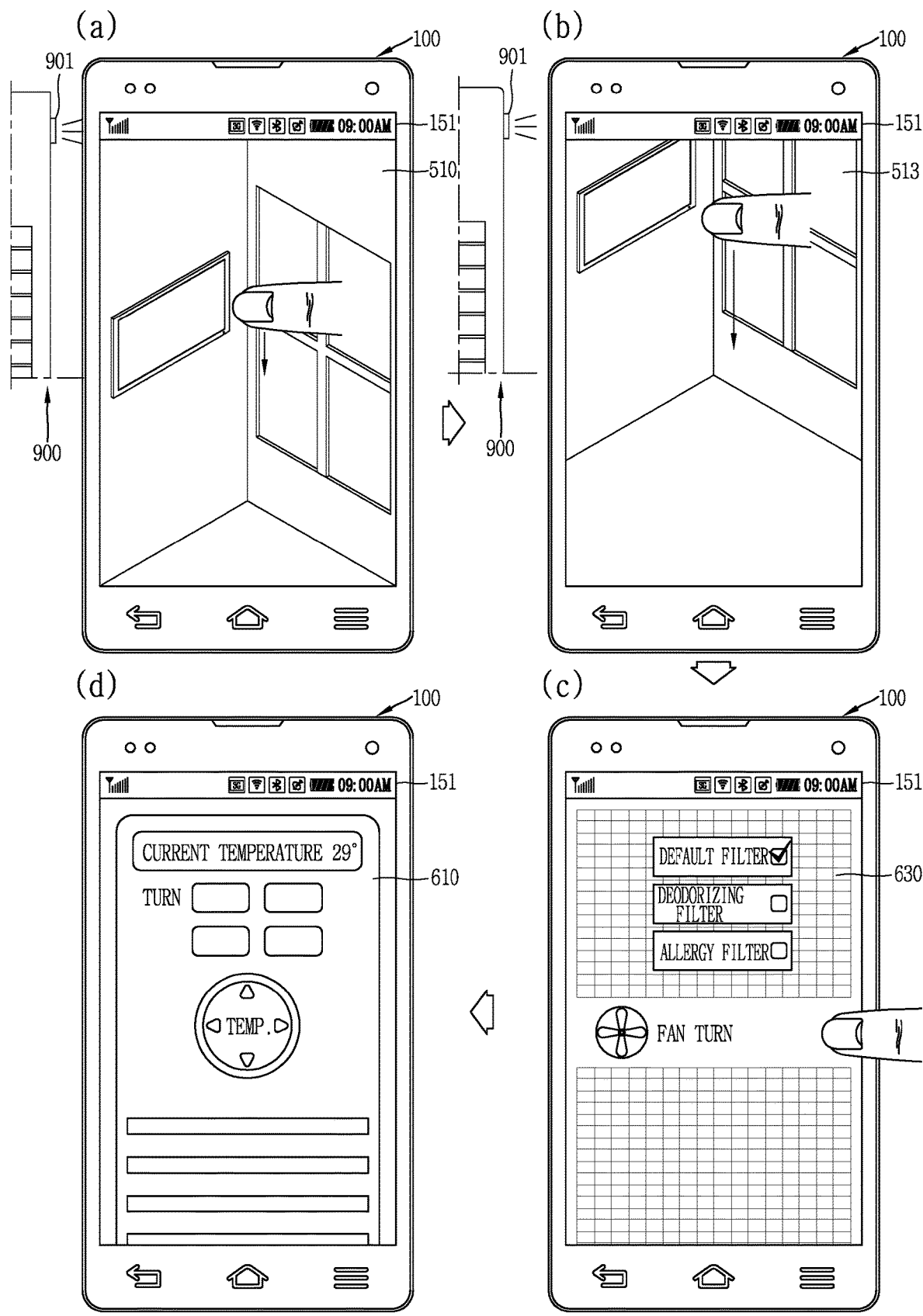
FIGS. 6A to 6D are conceptual views illustrating a method for controlling a mobile terminal based on a touch input applied to a display unit 151 while a control screen is output.

Referring to FIGS. 5A and 6A, the controller may output different control screens, in response to continuous touch inputs applied in different directions. For example, the user can be provided with a first control screen including an appearance in response to a touch input continuously applied in a left direction, and provided with a second control screen including a shape of an internal structure in response to a touch input continuously applied in a downward direction.

Hereinafter, a control method of outputting continuously-switched control screens will be described with reference to FIG. 6B. (a) of FIG. 6B illustrates the display unit 151 outputting the second screen information 630 for controlling the internal structure of the external device 900.

Figure 6B:
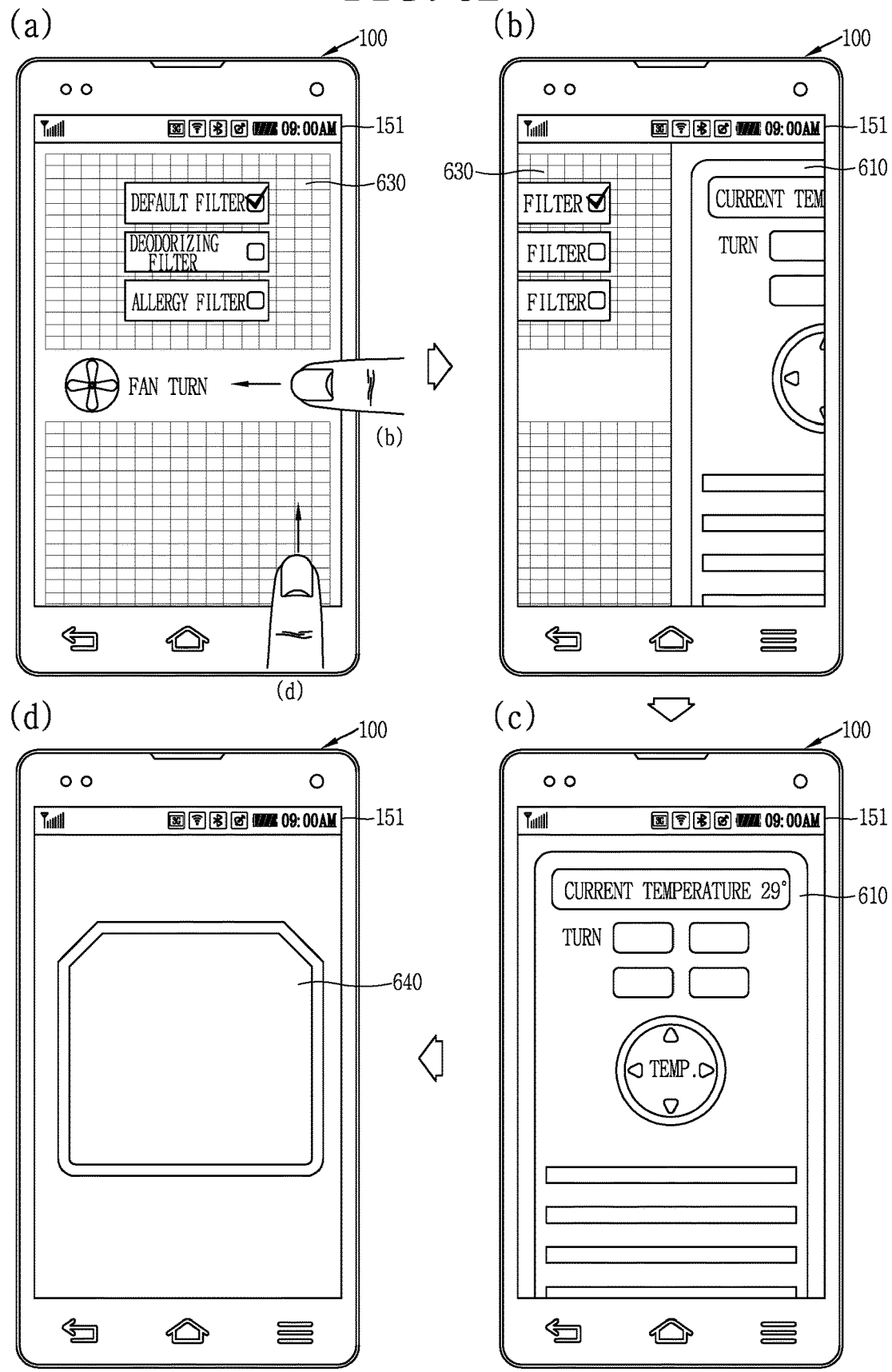

Referring to (a) and (b) of FIG. 6B, the controller may control the display unit 151 to output only a part of the second control screen 630 and restrict an output of the other region, in response to a third touch input applied in a left direction. In detail, the display unit 151 may output only a right partial region of the second control screen 630 according to a degree that the third touch input is applied in the left direction.

Also, the controller may control the display unit 151 to output a part of the first control screen 610 to be continued to a right edge of the second control screen 630 according to the third touch input. In detail, the part of the first control screen 610 may preferably correspond to a left region of the first control screen 610.

Referring to (b) and (c) of FIG. 6B, the controller may control the display unit 151 to fully output the first control screen 610, based on the applied degree of the third touch input.

Although not illustrated, the controller may control the display unit 151 to adjust transparency of the image 510 during the switching into the first control screen 610.

Meanwhile, referring to (a) and (d) of FIG. 6B, the controller may control the display unit 151 to output an upper (or lower) shape 640, in response to a fourth touch input applied to the display unit 151 in an upward direction.

In the drawings, the upper shape 640 does not include a graphic image receiving a second touch input, but the present invention may not be necessarily limited to this. The memory 160 may prestore the upper shape 640.

Figure 6C:
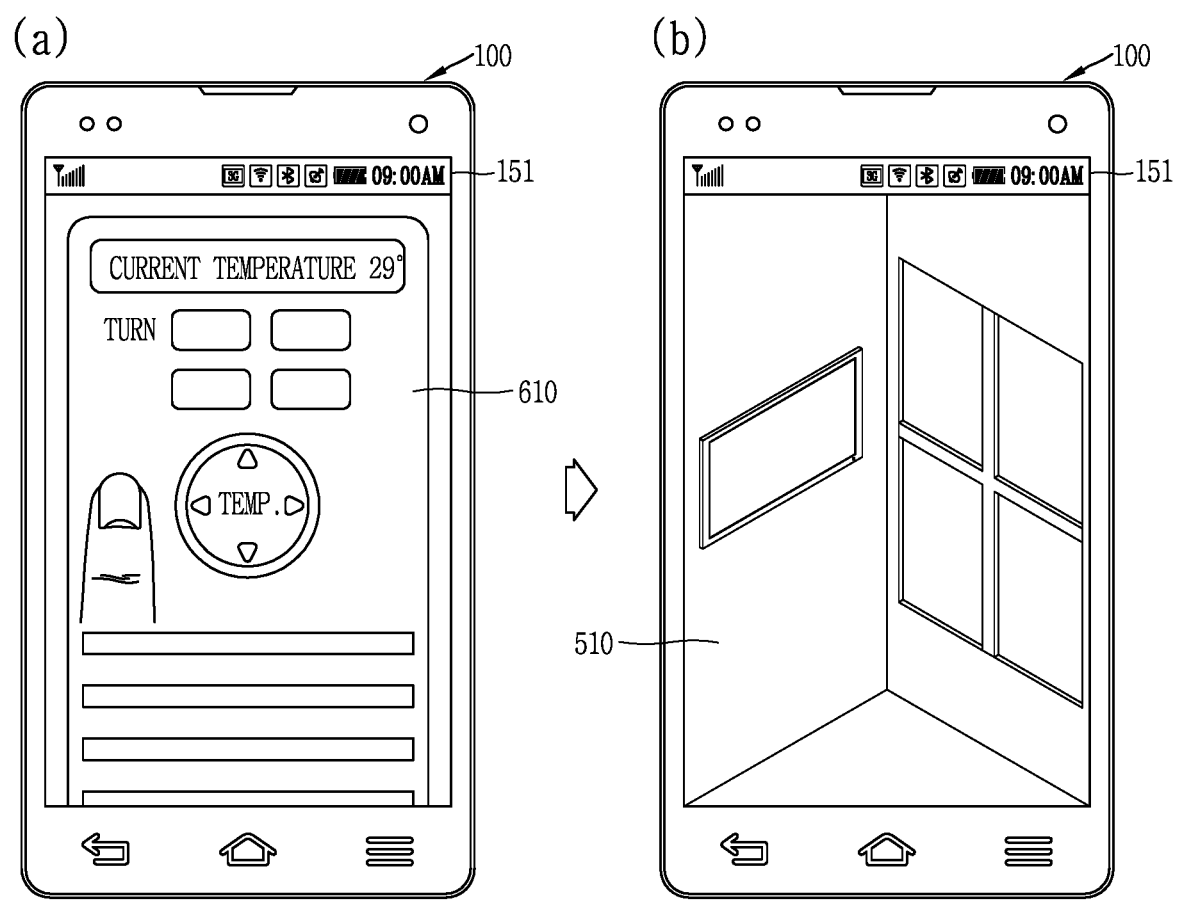

Hereinafter, a control method of switching a control screen into an image will be described with reference to FIG. 6C. The controller may control the display unit 151 to switch the first control screen 610 into the image 510, in response to a third touch input applied to the display unit 151 while the first control screen 610 is output.

Here, the third touch input may be implemented as a continuous touch input. The third touch input may be set substantially in the same direction as or in an opposite direction to the touch direction of the first touch input for outputting the first control screen 610 in the state that the image 510 is output.

That is, the user can immediately be provided with an image captured by the camera 901 without a separate control command, in a manner of applying a touch input to the control screen even while the control screen is output.

Figure 6D:
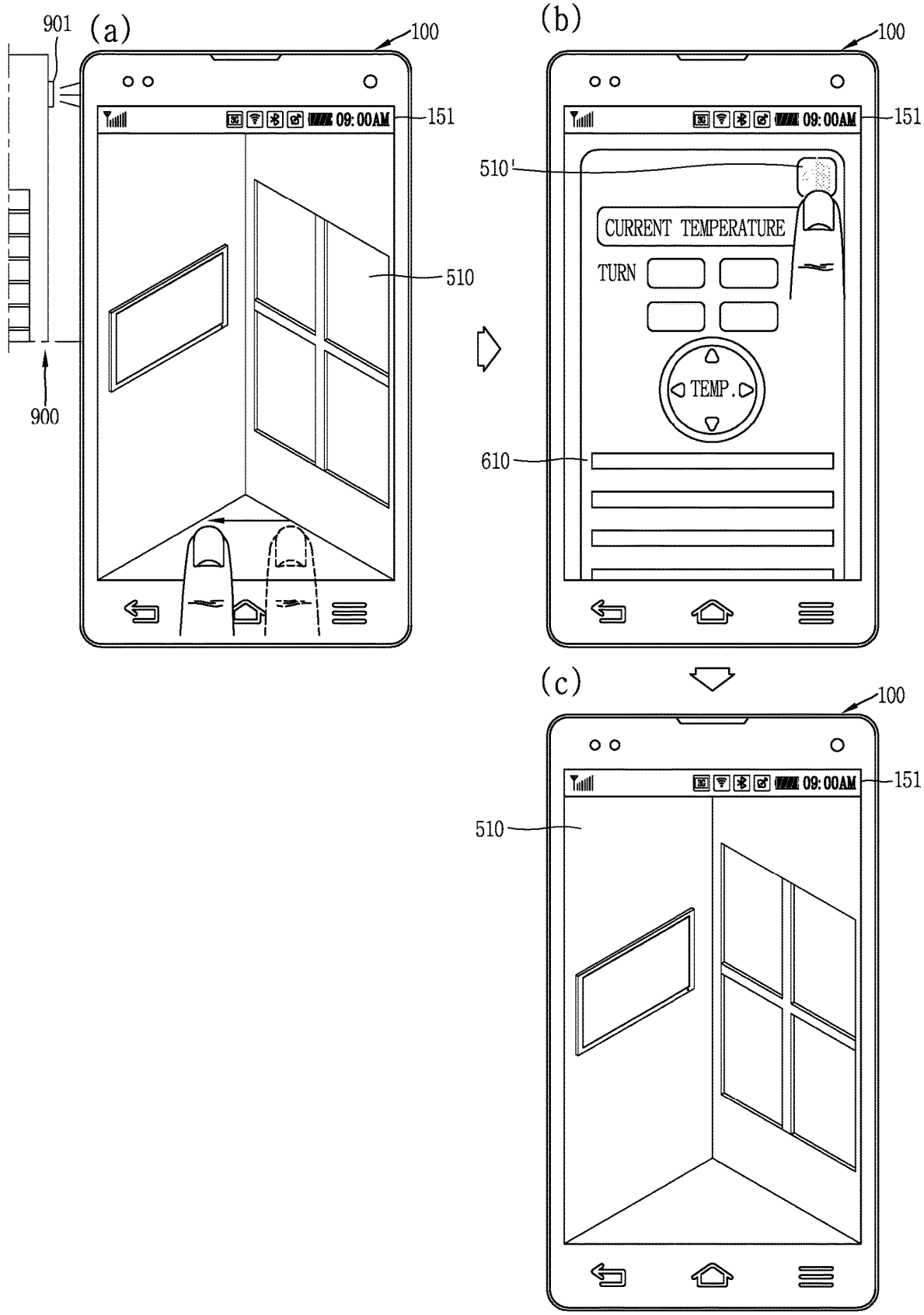

Hereinafter, a control method of outputting an image icon on a control screen will be described with reference to FIG. 6D. The controller may control the display unit 151 to output the first control screen 610, in response to the first touch input applied to the display unit 151 while the image 510 is output.

Meanwhile, the controller may control the display unit 151 to output an image icon 510' to overlap one region of the first control screen 610. The image icon 510' may correspond to an image of the external environment captured by the camera 901.

The image icon 510' may correspond to a scaled-down shape of the image 510 before being switched into the control screen.

Or, the image icon 510' may correspond to an image currently captured by the camera 901. In this instance, the camera 901 may be continuously activated even while the first control screen 510 is output on the display unit 151. Although not illustrated in detail, the controller may transmit a control signal for moving a capturing range of the camera 901 based on a first touch input applied to an inner region of the image icon 510'.

Meanwhile, while the first control screen 610 including the image icon 510' is output, the display unit 151 may receive the second touch input. The controller may control the display unit 151 to switch the first control screen 610 into the image 510 based on the second touch input applied to the image icon 510'.

According to those exemplary embodiments, while a control screen or image is output on the display unit 151, the user can switch the control screen or image into a desired screen, without termination or switching into an inactive state (i.e., without a separate control step).

Figure 7A:
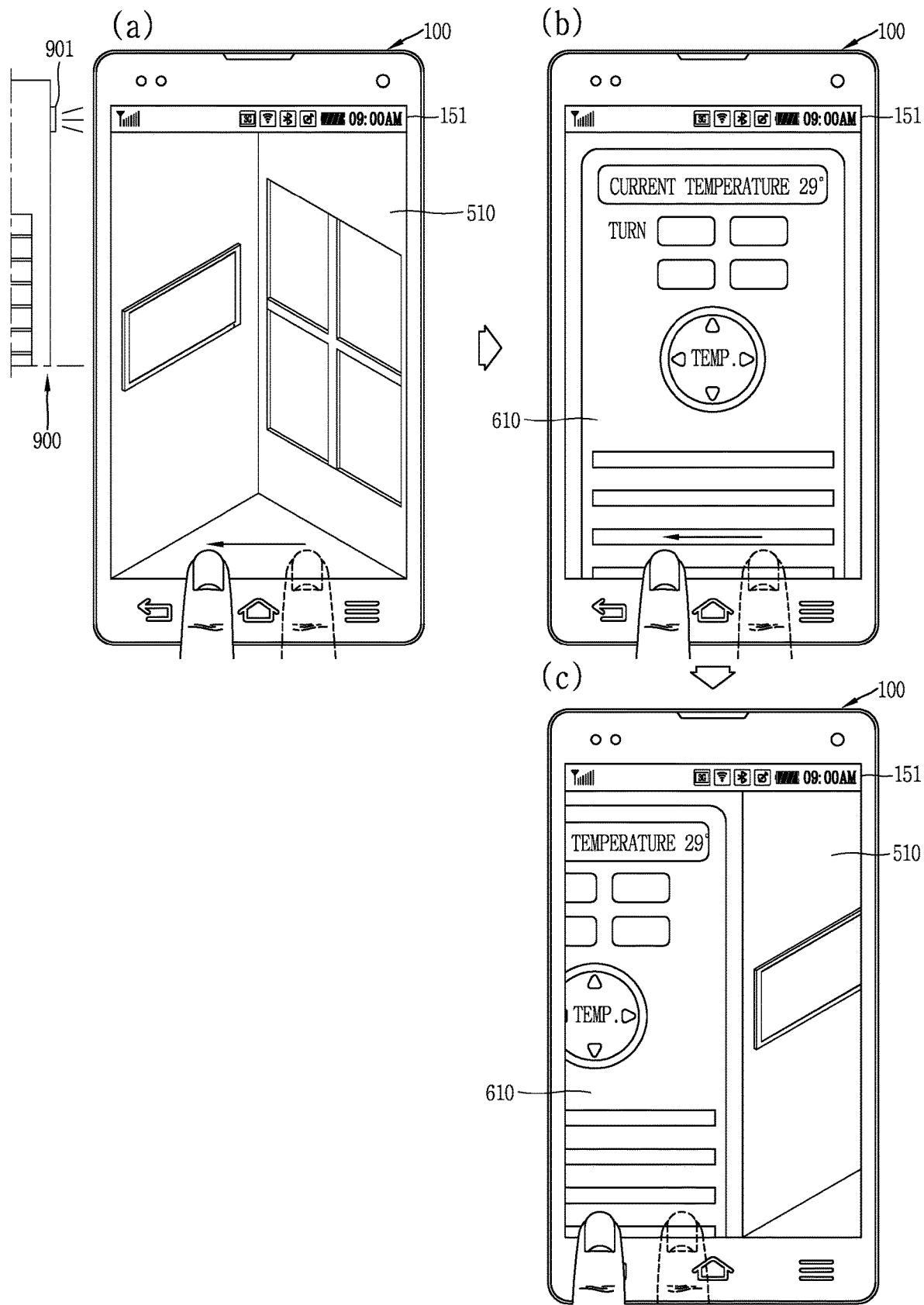
FIGS. 7A and 7B are conceptual views illustrating a switching method for an image and a control screen.
Figure 7B:
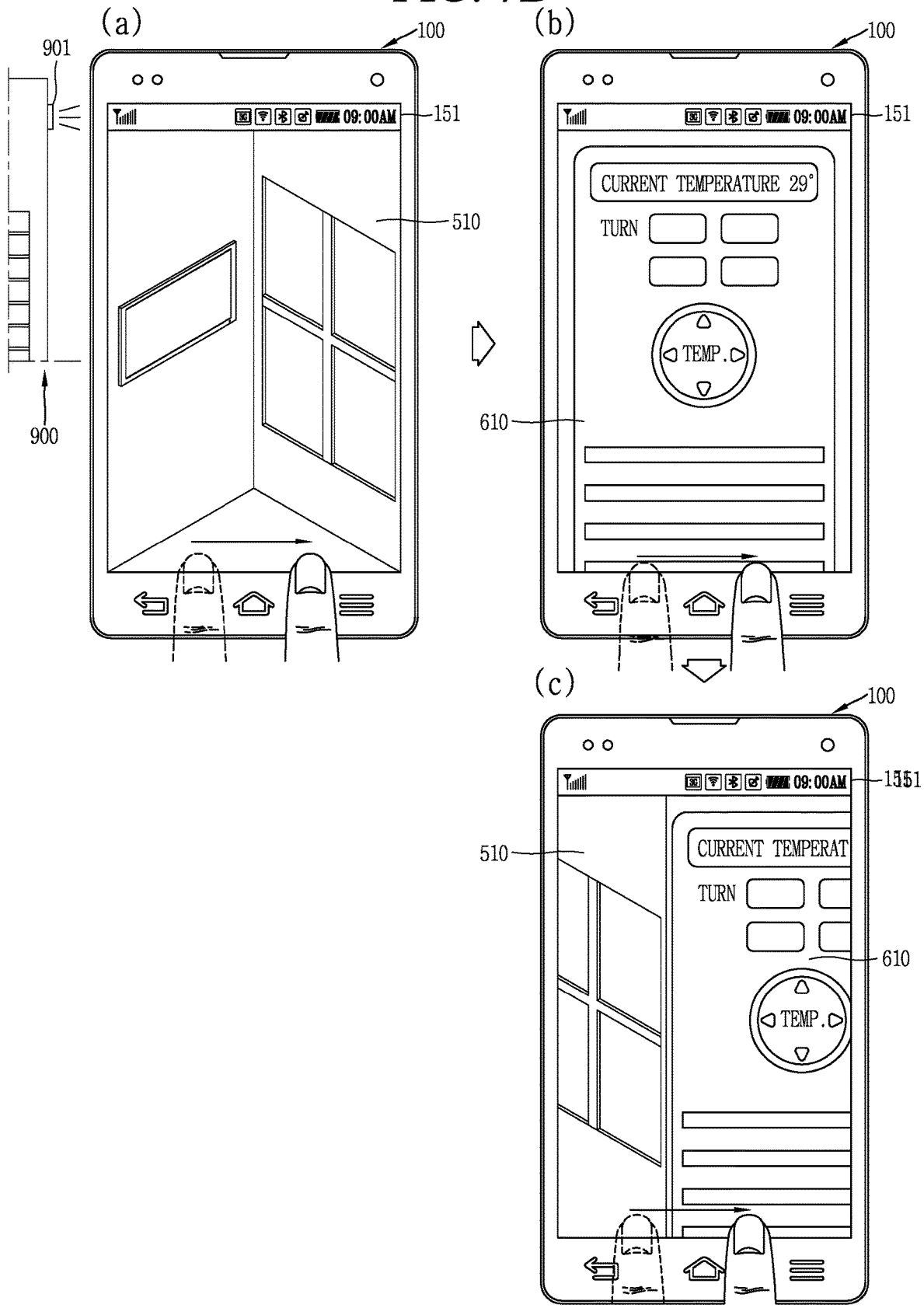

FIGS. 7A and 7B are conceptual views illustrating a method of switching an image and a control screen.

Referring to FIG. 7A, the display unit 151 may switch the image 510 into the first control screen 610, in response to a first touch input applied in the left direction.

A part of the image 510 may be output, in response to a third touch input applied to the display unit 151 in the left direction while the first control screen 610 is output. Here, the part of the image 510 may correspond to an image captured by the camera 901. The part of the image 510 may correspond to an image that the camera 901 has captured the external environment at a limit angle in a right direction. The limit of the camera 901 may depend on the applied direction of the third touch input.

Also, a part of a right region of the first control screen 610 and a part of a left region of the image 510 may be continuously output based on the applied range of the third touch input. In detail, the image 510 may be output continuously with a right edge of the first control screen 610.

The controller may control the display unit 151 to reduce an output range of the first control screen 610 and increase an output range of the image 510 based on the continuously-applied third touch input. Also, the controller may generate a control signal for changing the capturing direction of the camera 901 based on the third touch input.

Accordingly, the user can feel like looking at the front side of the external device naturally in a state of viewing the front surface of the external device 900.

Hereinafter, a control method executed according to a third touch input applied in a right direction will be described with reference to FIG. 7B. The display unit 151 may switch the image 510 into the first control screen 610, in response to a first touch input applied in the right direction. The controller may control the display unit 151 to output a part of the image 510, in response to the third touch input applied to the image 510 in the right direction.

The part of the image 510 may be output continuously with a right edge of the first control screen 610. The part of the image 510 may correspond to a part of an image captured by the camera 901 at a limit range in a left direction.

That is, the display unit 151 may output the image along with the control screen based on the third touch input, and the image may correspond to an image captured by the camera 901 at a limit angle decided based on the applied direction of the third touch input.

Figure 8A:
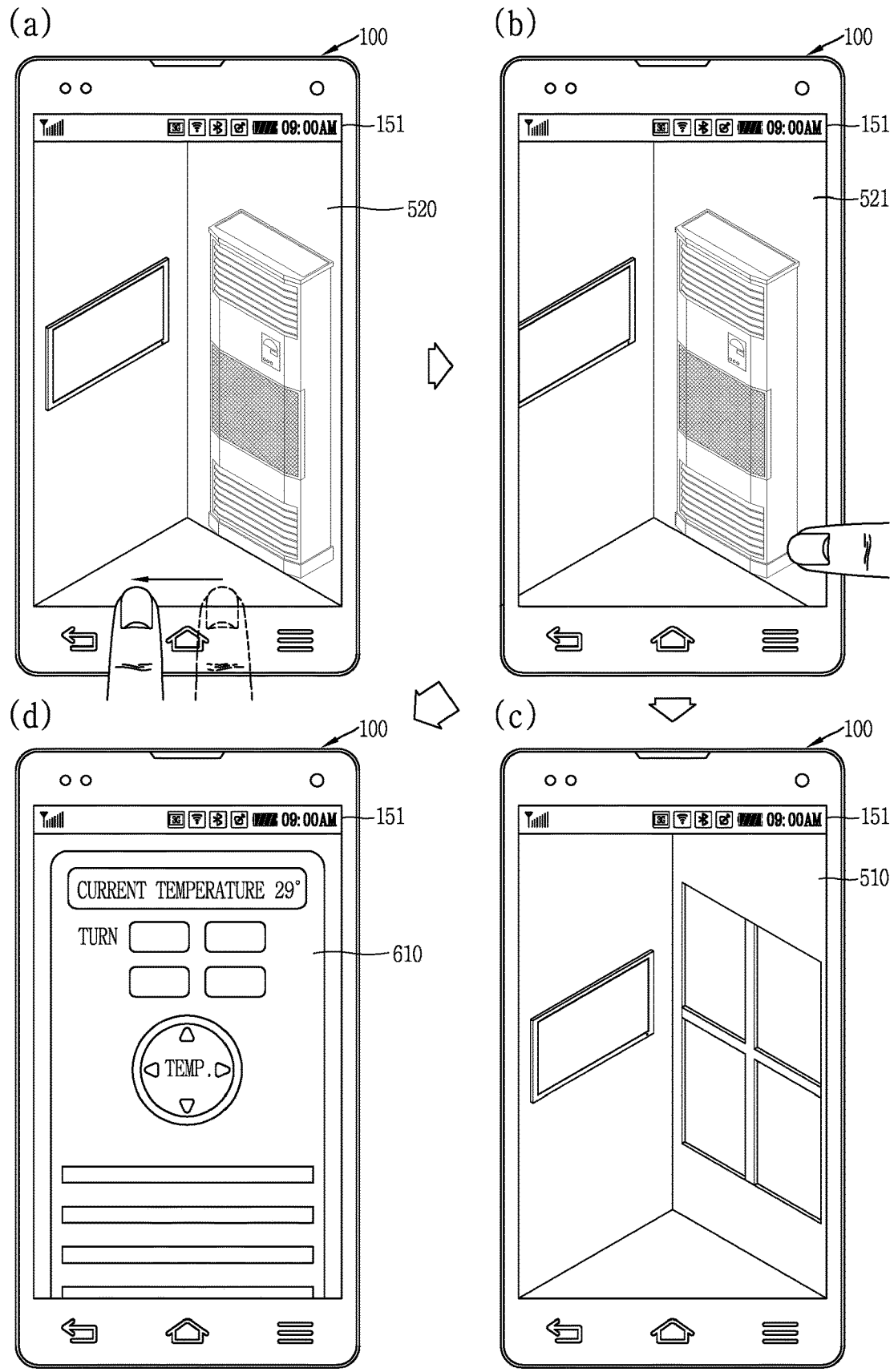
FIGS. 8A and 8B are conceptual views illustrating a control method of controlling at least one external device selected by using an image obtained by a camera mounted on an external device.
Figure 8B:
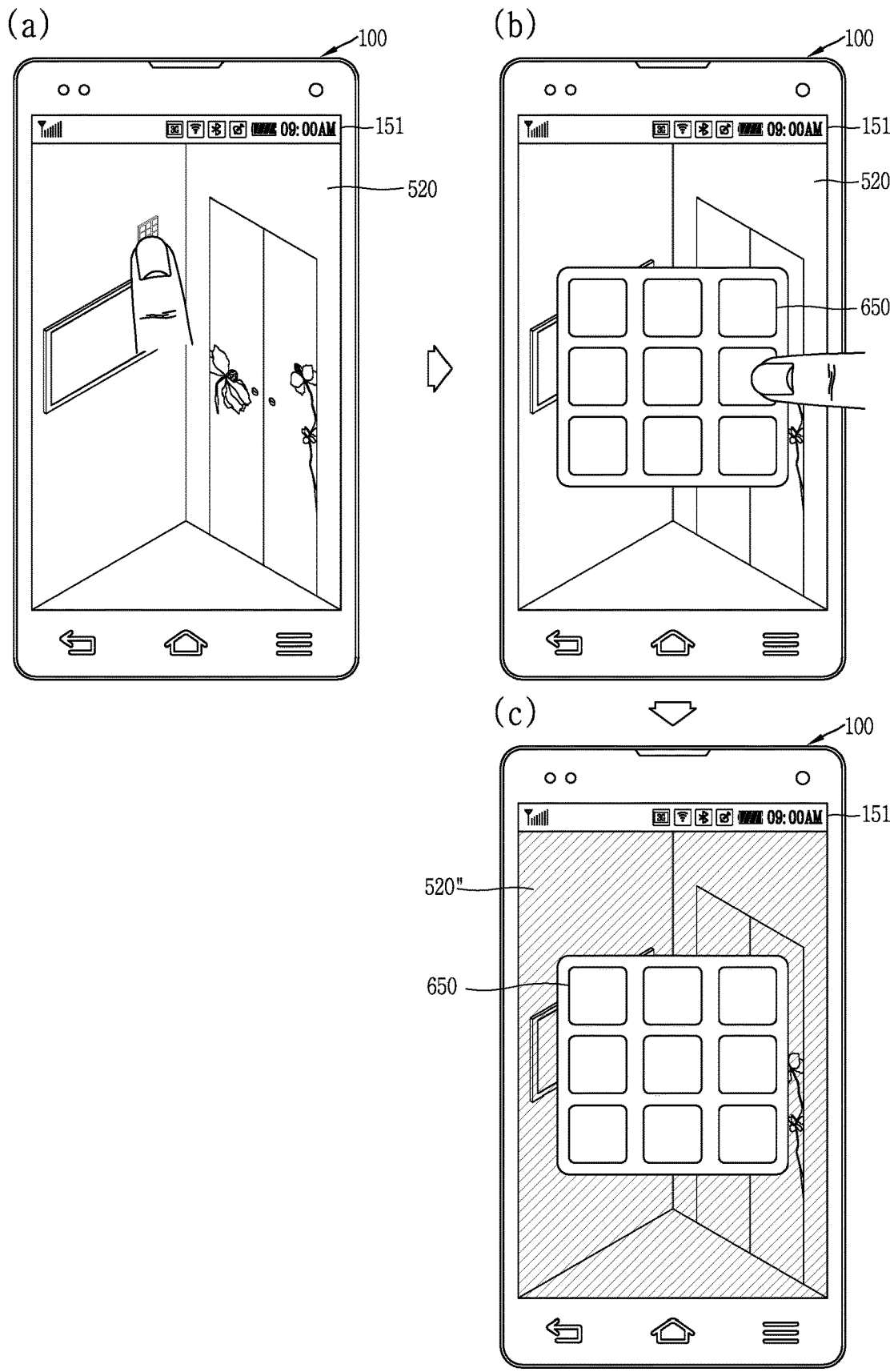

FIGS. 8A and 8B are conceptual views illustrating a control method of controlling at least one external device selected by using an image obtained by a camera mounted on an external device.

Hereinafter, a control method of controlling an external device selected from a plurality of external devices included in an image will be described with reference to FIG. 8A. (a) of FIG. 8A illustrates the display unit 151 outputting an image captured by a camera which is fixed at a preset place within a room.

The controller may control the wireless communication unit 110 to transmit a control signal for controlling a capturing direction of the camera when a first touch input is applied to the display unit 151 while an image 520 is output. The display unit 151 may switch the image 520 into a transformed image 521 based on the first touch input. The image 520 and the transformed image 521 may include at least one home appliance captured.

Referring to (b) and (c) of FIG. 8A, the controller may select one external device, in response to a fifth touch input applied to the display unit 151 while the transformed image 521 is output. The controller may control the wireless communication unit 110 to perform wireless communication with the external device when the external device is selected.

After establishing the wireless connection with the external device, the controller may control the display unit 151 to output a select image 510 captured by a camera mounted on the external device. In this exemplary embodiment, the control method for the external device may be substantially the same as that illustrated in the foregoing embodiment.

For example, the controller may control the camera of the external device and control the display unit 151 to output a control screen of the external device, in response to a first touch input applied to the display unit 151 while the select image 510 is output.

Meanwhile, referring to (b) and (d) of FIG. 8A, the controller may select the external device, in response to a fifth touch input applied to the display unit 151 while a transformed image 520 is output. Also, the controller may control the display unit 151 to immediately output a first control screen 610 of the selected external device.

According to this exemplary embodiment, one of a plurality of external devices included in an image captured by a camera can be selected and a control screen for controlling the selected external device can be provided more easily.

Hereinafter, a control method of outputting a control window for the selected external device will be described with reference to FIG. 8A. The controller may output a control window 650 in a manner of overlapping one region of the image 520, in response to the fifth touch input applied to the image 520. The control window 650 may include a graphic image receiving a touch input for controlling the selected external device, and also include an enlarged shape of at least one region of the appearance of the external device.

The controller may control the external device based on a touch input applied to the control window 650 while controlling the camera to keep capturing the external environment.

For example, when the external device is a lighting device such as a lamp, the controller may adjust a light emission degree based on a touch input applied to the display unit 151. Also, the user can recognize brightness of an external environment according to the light emission degree based on an image 520' captured by the camera.

This may allow the user to immediately sense the change in the external environment according to the control of the external device.

Figure 9A:
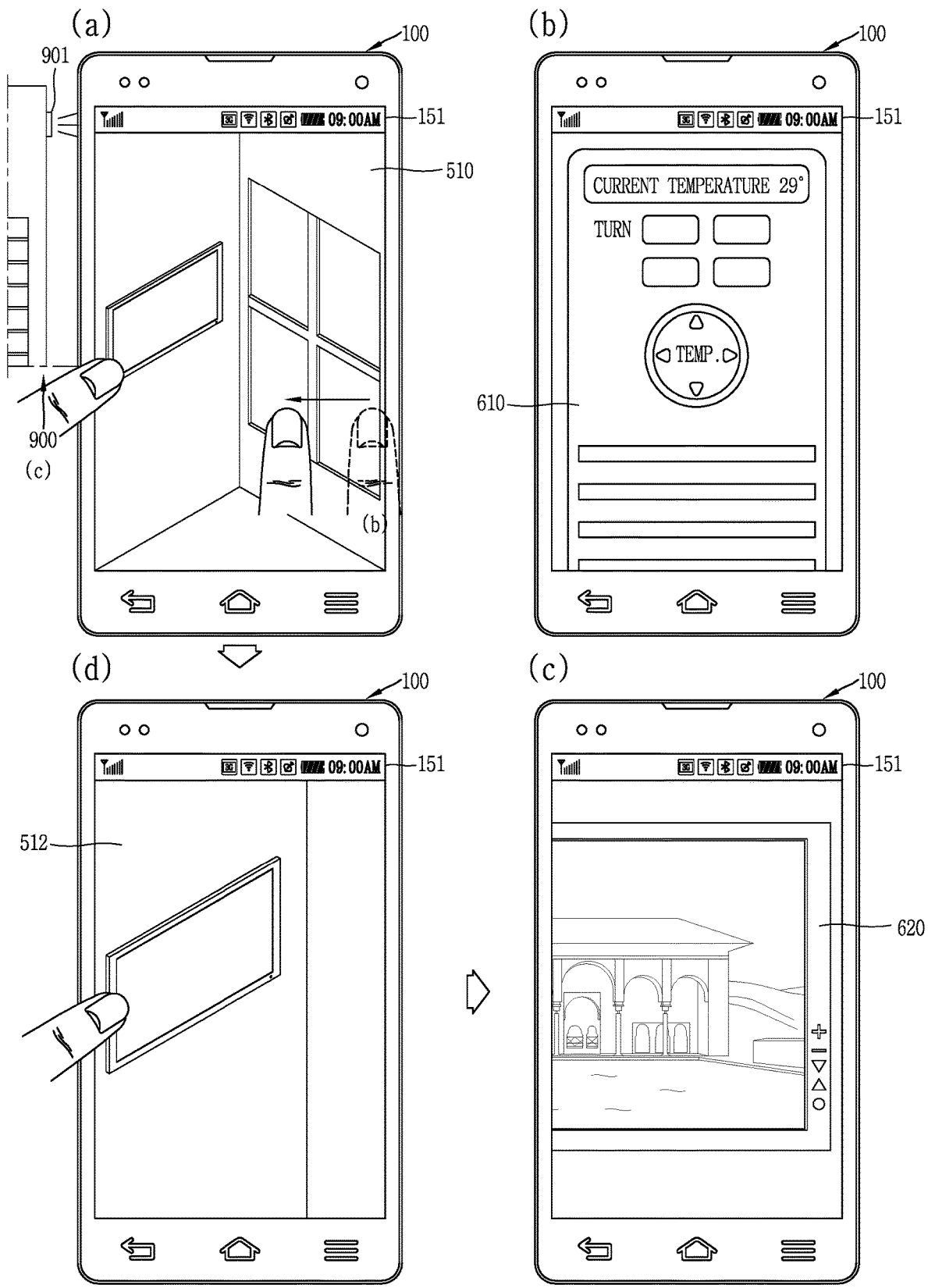
FIGS. 9A and 9B are conceptual views illustrating a control method of controlling an additional device using a camera mounted on an external device.
Figure 9B:
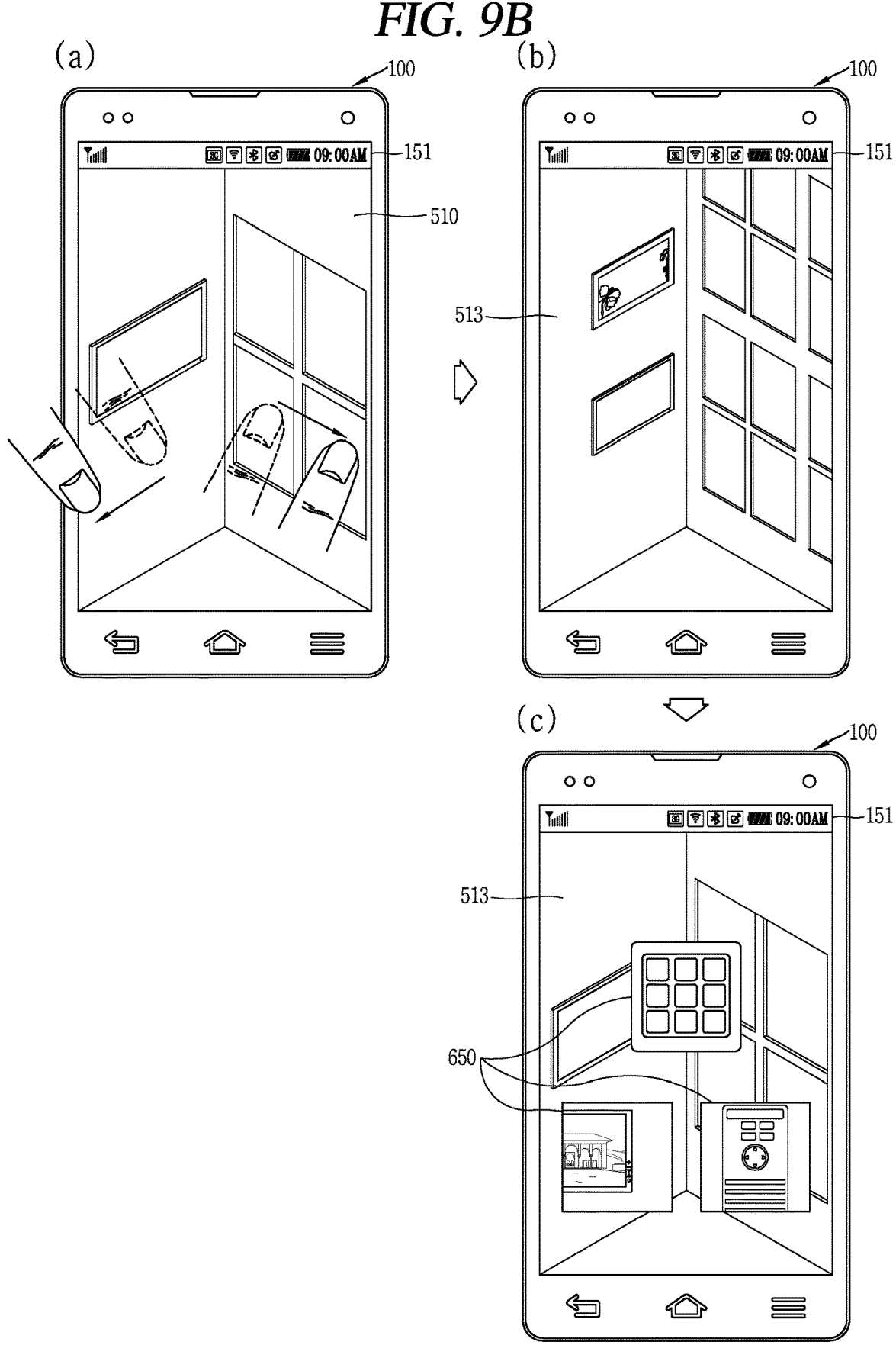

FIGS. 9A and 9B are conceptual views illustrating a control method of controlling an additional device using a camera mounted on an external device.

Hereinafter, a control method of controlling a first external device or a second external device based on a different touch input will be described with reference to FIG. 9A. (a) of FIG. 9A illustrates the display unit 151 which outputs an image 510 captured by a camera 901 mounted on a first external device 900.

Referring to (a) and (b) of FIG. 9A, the controller may control the display unit 151 to output a first control screen 610 associated with the first external device 900, in response to a first touch input applied to the display unit 151 on which the image 510 is output.

Meanwhile, referring to (a) and (c) of FIG. 9A, the controller may select a second external device based on a sixth touch input (e.g., a long touch input) applied to the display unit 151. The controller may control the display unit 151 to switch the second external device into an enlarged transformed image 512. Also, when the sixth touch input is continued in the output state of the transformed image 512, the controller may control the wireless communication unit 110 to establish a wireless connection with the second external device.

The controller may also control the display unit 151 to output a control screen 620 associated with the second external device. Although not illustrated, the user can control the second external device by applying a second touch input to the control screen 620.

Hereinafter, a control method of outputting a plurality of control windows 650 associated with a plurality of external devices will be described with reference to FIG. 9B. The controller may control the wireless communication unit 110 to transmit a control signal for executing a zoom-out function of the camera, in response to a seventh touch input (e.g., a pinch-in touch input) applied to the display unit 151 on which the image 510 is output. Also, the display unit 151 may output a transformed image 513 due to the zoom-out.

The controller may also control the display unit 151 to output a plurality of control windows 650 corresponding to the plurality of external devices, respectively, when shapes of the plurality of external devices are included in the transformed image 513. The plurality of control windows 650 may be output in a manner of overlapping the transformed image 513 and output at regions adjacent to the shapes of the external devices, respectively.

Accordingly, the user can control not only an external device having a camera using an image captured by the camera but also another external device included in the image.

The configurations and methods of the foregoing embodiments may not be limitedly applied to the mobile terminal, the image display device and the like, but part or all of the embodiments can be selectively combined to implement different variations.

INDUSTRIAL AVAILABILITY

The embodiments of the present invention provide an image captured by a camera and a control window of an external device to be intuitively switched with each other, and may be applied to various fields of controlling the external device.

The invention claimed is:

1. A mobile terminal, comprising:
a wireless communication unit capable of receiving an image obtained by a camera mounted on an external device wirelessly connected to the mobile terminal;
a display unit capable of outputting the image, and receiving a first touch input applied thereto to transmit a wireless signal for changing a capturing range of the camera; and
a controller capable of:
switching the image into a control screen adapted to receive a second touch input for controlling the external device, when the capturing range of the camera reaches a preset limit, and
in response to receiving the second touch input, controlling the external device without changing the capturing range of the camera or otherwise moving the camera,
wherein the controller controls the display unit to switch the image into the control screen in a continuous form based on a direction of the applied first touch input, and
wherein the controller controls the display unit to enlarge the image captured by the camera when a touch input is applied to the image captured by the camera.

2. The terminal of claim 1, further comprising a memory capable of storing at least one image obtained by the camera.

3. The terminal of claim 2, wherein the control screen corresponds to a first control screen including a shape of an appearance of the external device and button images for controlling the external device.

4. The terminal of claim 2, wherein the control screen corresponds to a second control screen including an image associated with internal structures of the external device, and button images for receiving touch inputs to control the respective internal structures, so as to control the external device.

5. The terminal of claim 3, wherein the controller, when the second touch input is continuously applied to the display unit in an output state of the first control screen, controls the display unit to output a second control screen, the second control screen including an image associated with internal structures of the external device, and button images for receiving touch inputs to control the respective internal structures.

6. The terminal of claim 1, wherein the controller controls the display unit to switch the control screen back into the image, in response to a third touch input applied to the display unit in an output state of the control screen.

7. The terminal of claim 6, wherein the controller controls the wireless communication unit to transmit a control signal so that the external device controls an operation of the camera, based on the third touch input, and wherein the controller controls the wireless communication unit to receive an image captured by the camera, starting from one limit selected based on the third touch input.

8. The terminal of claim 7, wherein the controller controls the wireless communication unit to receive an image captured in a second direction, opposite to a first direction, based on a third touch input continuously applied in the first direction.

9. The terminal of claim 8, wherein the controller controls the display unit to restrict an output of a partial region of the control screen when the control screen is moved in response to the third touch input, and wherein the display unit outputs an image obtained by the camera, continuously with one edge of the control screen.

10. The terminal of claim 1, wherein the controller generates a control command for zooming the camera in based on an applied region of a fourth touch input, when the fourth touch input is applied to the image, and wherein the controller controls the display unit to output a third control screen for controlling another device included in the image when the fourth touch input is continuously applied.

11. The terminal of claim 1, wherein the controller controls the display unit to gradually adjust transparency of the image or gradually adjust an output region of the image while the image is switched into the control screen.

12. A control system, comprising:

an external device including a camera, the camera being capable of generating an image by capturing an external environment; and a mobile terminal capable of receiving the image, wherein the external device is wirelessly connected to the mobile terminal, wherein the mobile terminal comprises:

a wireless communication unit capable of receiving a wireless signal associated with the image;

a display unit capable of outputting the image and receiving a first touch input for adjusting a capturing range of the camera; and a controller capable of controlling the display unit to output a control screen when the capturing range reaches a limit, the control screen being adapted to receive a second touch input for controlling the external device, wherein in response to receiving the second touch input, the controller is configured to control the external device without changing the capturing range of the camera or otherwise moving the camera, and wherein the controller controls the display unit to enlarge the image captured by the camera when a touch input is applied to the image captured by the camera.

13. The control system of claim 12, wherein the touch input applied to the display unit corresponds to a control command for zooming the camera in for enlarging an image of the external device.

14. The control system of claim 13, wherein the touch input applied to the display unit corresponds to a control command for zooming the camera out, and wherein the control screen includes at least one control image for receiving a touch input to control the external device.

15. A method for controlling a mobile terminal, the method comprising:

receiving an image obtained by a camera mounted on an external device wirelessly connected to the mobile terminal;

outputting the image on a display unit;

transmitting a wireless signal for changing a capturing range of the camera, in response to a first touch input applied to the display unit;

outputting an image according to the changed capturing range;

switching the image into a control screen adapted to receive a second touch input for controlling the external device, when the capturing range reaches a limit;

controlling the external device without changing the capturing range of the camera or otherwise moving the camera in response to receiving the second touch input; and enlarging the image captured by the camera when a touch input is applied to the image captured by the camera.

16. The method of claim 15, further comprising:

transmitting a control command based on the second touch input to the external device.

17. The method of claim 15, further comprising switching the control screen back into the image when the first touch input is continuously applied while the control screen is output.

18. The method of claim 15, wherein the display unit is controlled to switch the control screen back into the image, in response to a third touch input different from the first touch input, while the control screen is output, and wherein the first and third touch inputs are applied onto the display unit in opposite directions to each other.

19. The method of claim 15, wherein the display unit is controlled to switch the control screen back into the image, in response to a third touch input different from the first touch input, while the control screen is output, and wherein the first and third touch inputs applied to the display unit during the output of the image correspond to control commands for zooming in and zooming out the camera, respectively.

* * * * *